(12) United States Patent
Lupo et al.

(10) Patent No.: US 11,922,268 B1
(45) Date of Patent: Mar. 5, 2024

(54) OBJECT IDENTIFICATION BASED ON A PARTIAL DECODE

(71) Applicant: ZEBRA TECHNOLOGIES CORPORATION, Lincolnshire, IL (US)

(72) Inventors: Francesco Lupo, London (GB); Alessandro Bay, London (GB); Andrea Mirabile, London (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/103,712

(22) Filed: Jan. 31, 2023

(51) Int. Cl.
*G06K 7/14* (2006.01)
(52) U.S. Cl.
CPC .................. *G06K 7/1413* (2013.01)
(58) Field of Classification Search
CPC .. G06K 7/1404; G06K 7/1408; G06K 7/1413; G06K 7/1417; G06K 7/1439
See application file for complete search history.

(56) References Cited

U.S. PATENT DOCUMENTS

| | | | |
|---|---|---|---|
| 2007/0119944 A1* | 5/2007 | Cai ........................ | G06K 7/14 235/462.25 |
| 2023/0325620 A1* | 10/2023 | Faaborg ............... | G06K 7/1434 235/462.01 |

* cited by examiner

*Primary Examiner* — Laura A Gudorf
(74) *Attorney, Agent, or Firm* — Yuri Astvatsaturov (57) ABSTRACT

Systems and methods for enhancing decoding of indicia are disclosed herein. An example implementation includes: generating a visual embedding from image data; identifying, in the image data, a partial indicia and decoding the partial indicia to determine at least a partial payload; responsive to the at least partial payload not being a full payload, determining one or more candidate visual embeddings corresponding to the partial payload; comparing the one or more candidate visual embeddings to the visual embedding generated from the image data and assigning a correspondence score for each of the one or more candidate visual embeddings based on the comparison; and determining a recommendation based on the correspondence score for each of the one or more candidate visual embeddings.

20 Claims, 6 Drawing Sheets

| Payload | Visual Embedding |
|---|---|
| 38000168049 | 0.234; 1.3265; 4.4532 |
| 38000168048 | 0.432; 4.9532; 3.32 |
| 38000168050 | 0.9456; 0.442; 5.9432 |
| 38000168051 | 3.94321; 0.312; 5.123 |

FIG. 7

OBJECT IDENTIFICATION BASED ON A PARTIAL DECODE

BACKGROUND

Current barcode decoding systems work well when a clear image of the entire barcode is captured. However, current systems suffer when the barcode is not entirely visible (e.g., the camera's view of the barcode is obstructed, part of the barcode is blurry in the image, the barcode label is damaged, barcodes are imaged under extreme lighting conditions, etc.). Thus, there is a need to improve decoding for scenarios when the barcode is only partially visible.

SUMMARY

In an embodiment, the present invention is a method for enhancing decoding of indicia. The method may comprise: capturing image data with an imaging device, the image data including a partial indicia encoding at least a partial payload; generating a visual embedding from the image data; identifying, in the image data, the partial indicia and decoding the partial indicia to determine the at least partial payload; responsive to the at least partial payload not being a full payload, determining one or more candidate visual embeddings corresponding to the at least partial payload; comparing the one or more candidate visual embeddings to the visual embedding generated from the image data and assigning a correspondence score for each of the one or more candidate visual embeddings based on the comparing of the one or more candidate visual embeddings to the visual embedding generated from the image data; and determining a recommendation based on the correspondence score for each of the one or more candidate visual embeddings.

In a variation of this embodiment, the recommendation is to determine the full payload according to a highest score of the correspondence scores assigned for each of the one or more candidate visual embeddings.

In another variation of this embodiment, the recommendation is to determine the full payload to be a character string corresponding to a highest score of the correspondence scores assigned for each of the one or more candidate visual embeddings.

In another variation of this embodiment, responsive to a highest correspondence score of the correspondence scores assigned for each of the one or more candidate visual embeddings being below a correspondence score threshold, determining the recommendation to be capturing additional image data at the imaging device; and the method further comprises: in response to determining the recommendation to be capturing the additional image data, capturing the additional image data with the imaging device, the additional image data including an indicia; and attempting to decode the indicia of the additional image data.

In a variation of this embodiment, each of the determined one or more candidate visual embeddings comprise a different array of numbers; the generated visual embedding comprises an array of numbers; and the comparing of the one or more candidate visual embeddings to the visual embedding generated from the image data comprises comparing each of the array of numbers of the candidate visual embeddings to the array of numbers of the generated visual embedding.

In another variation of this embodiment, each of the determined one or more candidate visual embeddings comprise a different array of numbers; the generated visual embedding comprises an array of numbers; and the comparing of the one or more candidate visual embeddings to the visual embedding generated from the image data comprises comparing each of the array of numbers of the candidate visual embeddings to the array of numbers of the generated visual embedding.

In another variation of this embodiment, the comparing the one or more candidate visual embeddings to the visual embedding generated from the image data comprises determining mathematical distances between the one or more candidate visual embeddings and the visual embedding generated from the image data.

In another variation of this embodiment, the generating the visual embedding comprises: (i) applying a localizer comprising a neural network to impose a bounding box surrounding an object in an image corresponding to the image data, and (ii) analyzing a portion of the image data that is inside the bounding box to generate the visual embedding.

In another variation of this embodiment, the one or more candidate visual embeddings comprise a first candidate visual embedding, and a second candidate visual embedding; and the first candidate visual embedding corresponds to a different viewpoint of an object than the second candidate visual embedding.

In another variation of this embodiment, the generating the visual embedding comprises using a visual embedding generator comprising a neural network.

In another variation of this embodiment, the neural network comprises a residual neural network.

In another variation of this embodiment, the determining the one or more candidate visual embeddings comprises filtering, based on the determined at least partial payload, visual embeddings stored in a database to determine the one or more candidate visual embeddings.

In another embodiment, the present invention is a machine vision system for enhancing decoding of indicia. The system may comprise: an imaging device configured to capture image data including a partial indicia encoding at least a partial payload; and a memory storing computer-readable instructions. The system may further comprise a processor configured to execute the computer-readable instructions stored on the memory to: receive the image data captured by the imaging device; generate a visual embedding from the image data; identify, in the image data, the partial indicia and decode the partial indicia to determine the at least partial payload; responsive to the at least partial payload not being a full payload, determine one or more candidate visual embeddings corresponding to the at least partial payload; compare the one or more candidate visual embeddings to the visual embedding generated from the image data and assign a correspondence score for each of the one or more candidate visual embeddings based on the compare of the one or more candidate visual embeddings to the visual embedding generated from the image data; and determine a recommendation based on the correspondence score for each of the one or more candidate visual embeddings.

In a variation of this embodiment, the processor is further configured to execute the computer-readable instructions stored on the memory to: responsive to the at least partial payload being a full payload, update a database by adding: (i) the full payload; (ii) the visual embedding generated from the image data; (iii) an indication that the full payload corresponds to the visual embedding generated from the image data.

In another variation of this embodiment, the recommendation is to determine the full payload according to a highest score of the correspondence scores assigned for each of the one or more candidate visual embeddings.

In another variation of this embodiment, the recommendation is to determine the full payload to be a character string corresponding to a highest score of the correspondence scores assigned for each of the one or more candidate visual embeddings.

In another variation of this embodiment, the processor is further configured to execute the computer-readable instructions stored on the memory to: responsive to a highest correspondence score of the correspondence scores assigned for each of the one or more candidate visual embeddings being below a correspondence score threshold, determine the recommendation to be capturing additional image data at the imaging device; in response to determining the recommendation to be capturing the additional image data, receive, the additional image data captured by the imaging device, the additional image data including an indicia; and attempt to decode the indicia of the additional image data.

In a variation of this embodiment, each of the determined one or more candidate visual embeddings comprise a different array of numbers; and the generated visual embedding comprises an array of numbers. Furthermore, the compare of the one or more candidate visual embeddings to the visual embedding generated from the image data may comprise comparing each of the array of numbers of the candidate visual embeddings to the array of numbers of the generated visual embedding.

In another variation of this embodiment, the compare of the one or more candidate visual embeddings to the visual embedding generated from the image data comprises determining mathematical distances between the one or more candidate visual embeddings and the visual embedding generated from the image data.

In another variation of this embodiment, the generate of the visual embedding comprises: (i) applying a localizer comprising a neural network to impose a bounding box surrounding an object in an image corresponding to the image data, and (ii) analyzing a portion of the image data corresponds to an inside of the bounding box to generate the visual embedding.

In another variation of this embodiment, the one or more candidate visual embeddings comprise a first candidate visual embedding, and a second candidate visual embedding; and the first candidate visual embedding corresponds to a different viewpoint of an object than the second candidate visual embedding.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Broadly speaking, some embodiments described herein provide for enhanced decoding of indicia (e.g., a 1-dimensional (1D) or 2-dimensional (2D) barcode (e.g., a quick response (QR) code), or any other indicia encoding a payload that may be decoded, such as via machine vision). For example, by way of reference to FIG. 1, an imaging device 104 may capture an image data, which it may process and/or send to the user computing device 102. The image data may include an indicia which is able to be decoded to determine the full payload thereof. However, in some situations, the imaging device 104 and/or computing device 102 may not be able to determine the entire payload. For example, the image data may include only part of the indicia (e.g., the indicia is partially covered by another object, such as the hand of a person scanning the object with the indicia, etc.). In other examples, part of the indicia may be blurry or the lighting conditions may mean that part of the indicia is visible and the rest of the indicia may be washed out and not visible.

Figure 6:
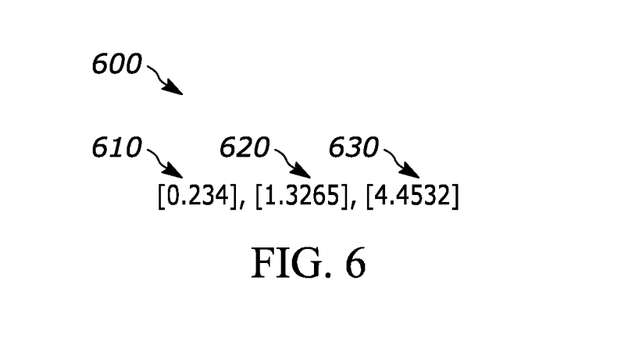
FIG. 6 shows an example visual embedding.

In some such scenarios (e.g., including images with partial indicia), current systems are unable to determine the full payload. In contrast, the techniques described herein advantageously provide for determining an entire payload when a captured image data includes a partial indicia. To this end, in some embodiments, the imaging device 104 and/or user computing device 102 decodes the partial indicia to the extent possible generating a partial payload, and simultaneously generates a visual embedding from the image data. The visual embedding may comprise an array of numbers. To further illustrate a visual embedding, FIG. 6 shows an example visual embedding 600 comprising an array of numbers (e.g., an array comprising first number 610, a second number 620, and a third number 630). Although the example of FIG. 6 illustrates a visual embedding comprising an array of three numbers, the visual embedding may comprise an array with any amount of numbers, so long as the visual embedding is of a sufficient array size to identify images that are similar from images that are dissimilar (e.g., for determining similarities between input images of an unspecified object and previously scanned images of known objects). Broadly speaking, the more numbers in the array, the more detail the visual embedding provides. The visual embedding may be generated via a machine learning algorithm such as neural network (NN) and in particular convolution neural network (CNN) having a suitable architecture, such as a residual neural network (ResNet). An example CNN to generate the visual embedding will be described elsewhere herein. Further the amount of numbers of a visual embedding may be determined by adjusting parameters of such a CNN, based on the numbers training images for an object, based on the number of image features expressed in those training images, or based on other factors or any combination thereof.

Figure 7:
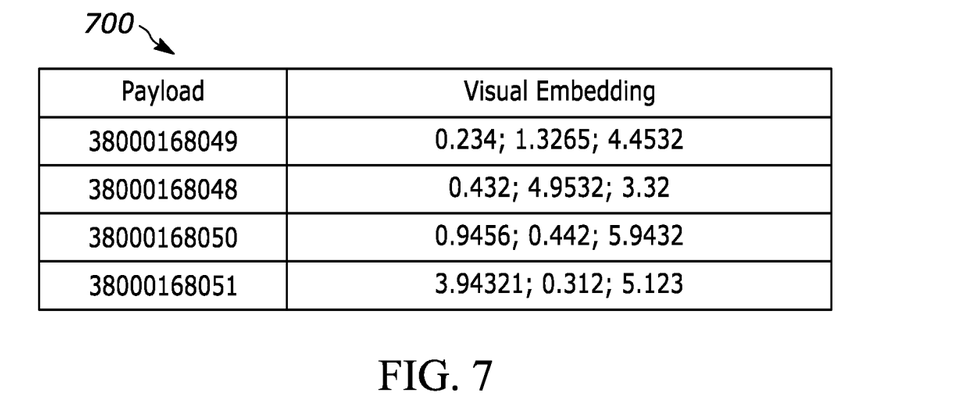
FIG. 7 shows an example table of payloads, and corresponding visual embeddings.

The partial payload may then be used to filter visual embeddings (e.g., visual embeddings stored in a database 150) to produce candidate visual embeddings that are potential matches of a full payload to the partial payload. For example, FIG. 7 shows example table 700 of payloads and corresponding visual embeddings that, as will be explained further below, may be filtered through based on the partial payload. Furthermore, in the illustrated example, the visual embeddings each comprise arrays of three numbers, in this example real numbers. For example, the array for the visual embedding corresponding to payload "38000168049" is ([0.234], [1.3265], [4.4532]).

The filtered visual embeddings may be compared to the visual embedding generated from the image data to produce correspondence scores. The correspondence scores may then be used to determine a recommendation, such as recommending the full payload to be a payload corresponding to the highest correspondence score, or recommending that a new image be captured (e.g., if no good match is found).

Figure 1:
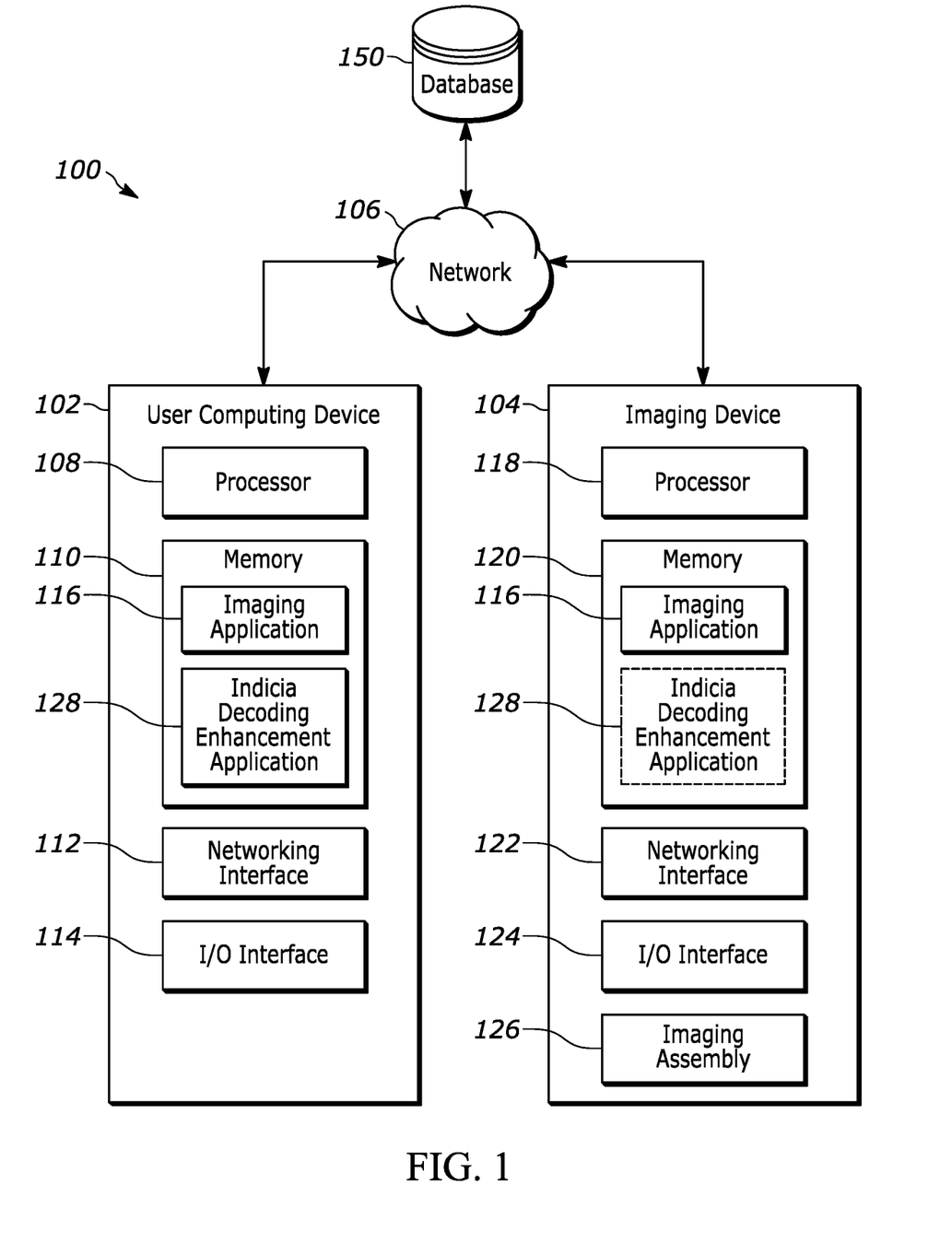
FIG. 1 is an example smart imaging system for enhancing decoding of indicia, in accordance with embodiments described herein.

More specifically, FIG. 1 illustrates an example imaging system 100 configured to enhance decoding of indicia, in accordance with various embodiments disclosed herein. In the example embodiment of FIG. 1, the imaging system 100 includes the user computing device 102 and the imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. Namely, the imaging device 104 may be connected to the user computing device 102 via a network 106, and may generally be configured to interpret and process information received from the user computing device 102.

The imaging device 102 may be any suitable device to capture image data, such as a handheld barcode reader, mounted barcode reader, or bi-optical (also referred to as "bi-optic") barcode reader (such as the example barcode reader 200 of FIG. 2, which will be described further below), for example. In some examples, the imaging device 102 may be a machine vision camera. In examples where the imaging device 102 is a bi-optic barcode reader, the bi-optic barcode reader have two optical elements. For instance, the example barcode reader 200 of FIG. 2 may have an optical element (e.g., a lens, an aperture, etc.) behind glass window 230, and another optical element behind the glass window 232.

In some examples where the imaging device 104 is a machine vision camera, the imaging device 104 may obtain a job file containing one or more job scripts from the user computing device 102 across the network 106 that may define the machine vision job and may configure the imaging device 104 to capture and/or analyze images in accordance with the machine vision job. The imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

In some further examples where the imaging device 104 is a machine vision camera, the user computing device 102 may be configured to enable a user/operator to, for example, create and upload a machine vision job for execution and/or otherwise interact with the imaging device 104. The user/operator may transmit/upload any configuration adjustment, software updates, and/or any other suitable information to the imaging device 104 via the network 106, where the information is then interpreted and processed accordingly. The user computing device 102 may comprise one or more operator workstations, and may include one or more processors 108, one or more memories 110, a networking interface 112, an input/output (I/O) interface 114, an imaging application 116, and an indicia decoding enhancement application 128.

Generally, the imaging application 116 may include and/or otherwise comprise executable instructions (e.g., via the one or more processors 108) that allow a user to configure a machine vision job and/or imaging settings of the imaging device 104. For example, the imaging application 116 may render a graphical user interface (GUI) on a display (e.g., I/O interface 114) of the user computing device 102, and the user may interact with the GUI to change various settings, modify machine vision jobs, input data, etc. Moreover, the imaging application 116 may output results of the executed machine vision job for display to the user, and the user may again interact with the GUI to approve the results, modify imaging settings to re-perform the machine vision job, and/or any other suitable input or combinations thereof.

Figure 3A:
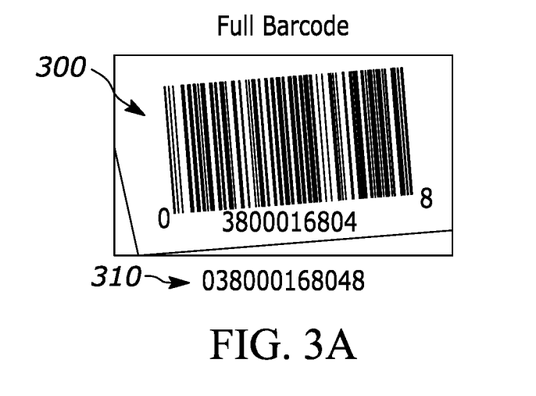
FIG. 3A illustrates an example of a full barcode, in accordance with embodiments described herein.
Figure 3B:
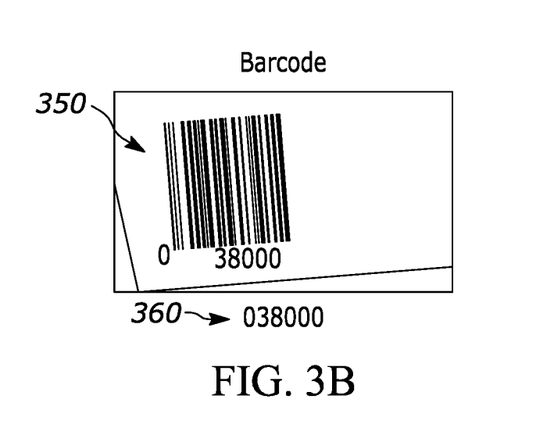
FIG. 3B illustrates an example of a partial barcode, in accordance with embodiments described herein.

The indicia decoding enhancement application 128 may include and/or otherwise comprise executable instructions (e.g., via the one or more processors 108) that enhances decoding of indicia, in particular partial indicia. For example, in some images, the entire indicia may be visible. One such example is illustrated by the example indicia 300 of FIG. 3A. However, in other images, only a partial indicia may be visible. For instance, the example partial indicia 350, illustrated in FIG. 3B, is the example indicia 300, except that it is only partially visible. Further regarding these examples, the user computing device 102 (e.g., via the imaging application 116 and/or indicia decoding enhancement application 128) is able to decode the example full barcode 300 to be "038000168048," but only able to decode the example partial indicia 350 to "038000." For illustrative purposes, FIG. 3A shows full payload 310 that the full barcode 300 may be decoded to; and FIG. 3B shows partial payload 360 that the partial barcode 350 may be decoded to. As will be seen, in accordance with the techniques described herein, in the situation where only part of the indicia is able to be decoded, the indicia decoding enhancement application 128 may make a recommendation, such as recommending a full payload (e.g., recommend a particular bar code to be taken as the payload), or recommending capturing an additional image.

Moreover, it should be noted that, as in the example of FIG. 1, the indicia decoding enhancement application 128 may be located at one or both of the imaging device 104 and/or the user computing device 102. As this illustrates, any of the operations of the indicia decoding enhancement application 128 may be performed at one or both of the imaging device 104 and/or the user computing device 102.

The imaging device 104 may include one or more processors 118, one or more memories 120, a networking interface 122, an I/O interface 124, an imaging assembly 126, as well as the imaging application 116 and, optionally, the indicia decoding enhancement application 128. The imaging assembly 126 may include a digital camera and/or digital video camera for capturing or taking digital images and/or frames. Each digital image may comprise pixel data that may be analyzed in accordance with instructions comprising the imaging application 116 and/or the indicia decoding enhancement application 128, as executed by the one or more processors 118, as described herein. The digital camera and/or digital video camera of, e.g., the imaging assembly 126 may be configured to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

The imaging device 104 may also process the 2D image data/datasets and/or 3D image datasets for use by other devices (e.g., the user computing device 102, an external server, etc.). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing, for example, the imaging application 116 and/or the indicia decoding enhancement application 128 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., imaging application 116, indicia decoding enhancement application 128, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110, 120 may also store the imaging application 116 and/or the indicia decoding enhancement application 128. Additionally, or alternatively, the imaging application 116 and/or the indicia decoding enhancement application 128 may also be stored in the external database 150, which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the imaging application 116 and/or the indicia decoding enhancement application 128, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external database 150 (e.g., a relational database, such as Oracle, DB2, MySQL, or a NoSQL based database, such as MongoDB). The data stored in the one or more memories 110, 120 and/or an external database 150 may include all or part of any of the data or information described herein, including, for example, visual embedding(s) corresponding to payloads (e.g., visual embedding(s) corresponding to barcodes or other indicia).

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally, or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to initiate imaging setting calibration, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
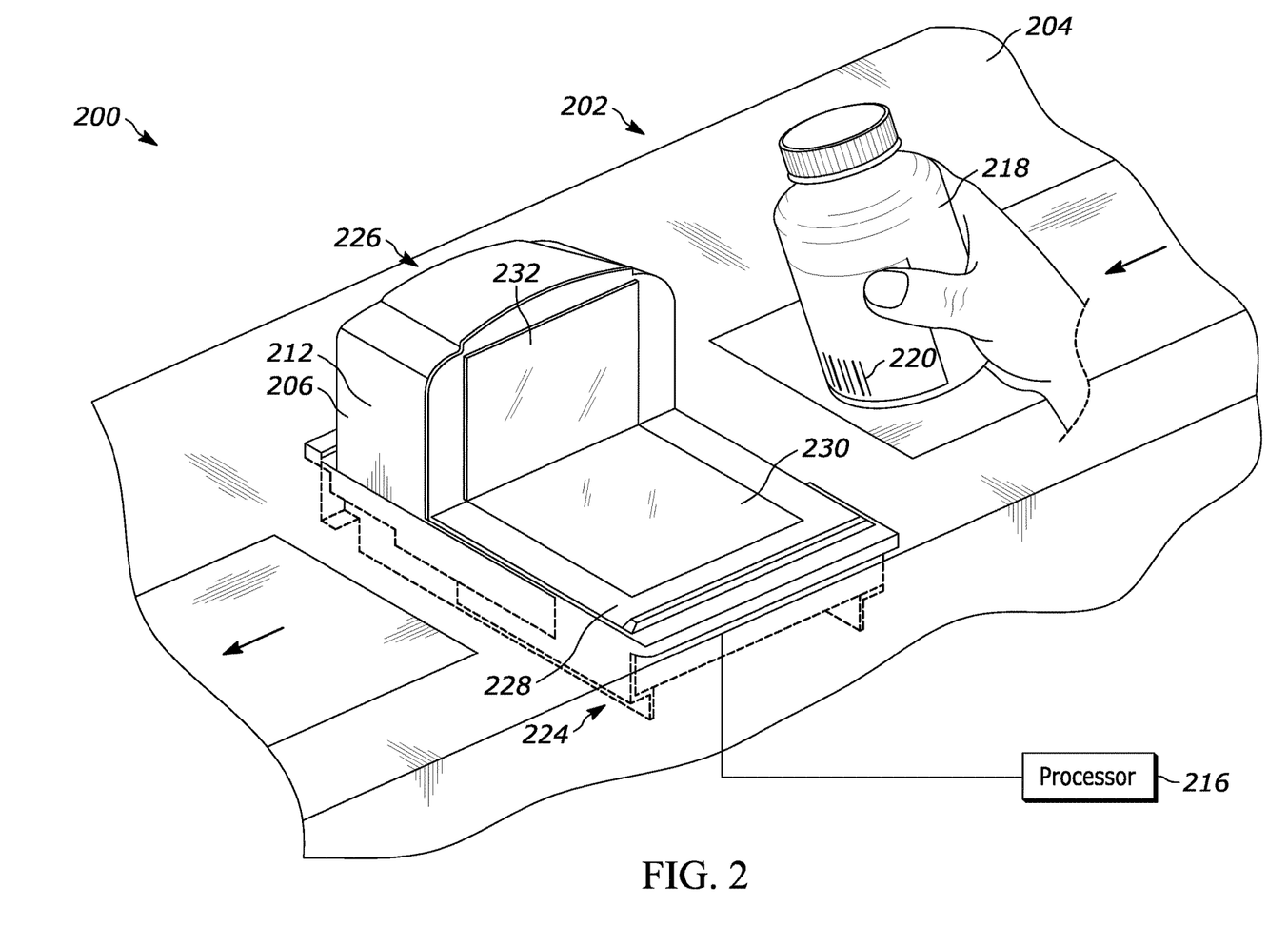
FIG. 2 illustrates an isometric view of barcode reading platform, in accordance with some embodiments described herein.

FIG. 2 illustrates a perspective view of an example scanning system 200 (e.g., an indicia reader) in accordance with the teachings of this disclosure. In the exemplary embodiment, the system 200 includes a workstation 202 with a counter 204 and a bi-optical (also referred to as "bi-optic") barcode reader 206. The barcode reader 206 may also be referred to as a bi-optic scanner or an indicia reader. In some implementations, the bi-optic barcode reader 206 may include an IR sensor in addition to a number of cameras, such as an RGB camera for imaging and a barcode camera for black and white imaging at a high framerate. In some implementations, the RGB camera provides higher resolution and color images at a slower framerate than the black and white barcode camera, which may have a resolution of approximately 1000 pixels across. The IR sensor may detect movement of an object across a scanning region for either or both cameras. The scanning system 200 may be managed by a store employee such as a clerk. In other cases, the scanning system 200 may be part of a self-checkout lane wherein customers are responsible for checking out their own products.

The barcode reader 206 includes a housing 212 comprised of a lower housing 224 and a raised housing 226. The lower housing 224 may be referred to as a first housing portion and the raised housing 226 may be referred to as a tower or a second housing portion. The lower housing 224 includes a top portion 228 and houses an glass window 230. In some embodiments, the top portion 228 may include a removable or a non-removable platter (e.g., a weighing platter). The top portion 228 can be viewed as being positioned substantially parallel with the counter 204 surface. In some implementations, the phrase "substantially parallel" refers to within 10 degrees of parallel. In further implementations, the phrase "substantially parallel" means the top portion 228 accounts for manufacturing tolerances. While the counter 204 and the top portion 228 are illustrated as being approximately co-planar in FIG. 2, in other embodiments, the counter 204 may be raised or lowered relative to the top surface of the top portion 228, where the top portion 228 is still viewed as being positioned substantially parallel with the counter 204 surface.

The raised housing 226 is configured to extend above the top portion 228 and includes an glass window 232. The raised housing 226 is positioned in a generally perpendicular plane relative to the top portion 228.

Glass windows 230 and 232 include optical assemblies of optical elements such as lenses, apertures, etc., and at least one image sensor. Glass windows 230 and 232 are further communicatively coupled to a processor 216. The image sensors may include one or more color cameras, one or more monochrome imagers, and/or one or more optical character readers. The processor 216 may be disposed within the barcode reader 206 or may be in another location. The glass windows 230 and 232 are operable to capture one or more images of targets (e.g., object 218) within their respective fields of view (FOV). In the exemplary embodiment of FIG. 2, glass windows 230 and 232 are included in the same barcode reader 206. In other embodiments, the glass windows 230 and 232 are included in different barcode readers.

The object 218 may be swiped past the barcode reader 206. In doing so, a product code (e.g., an indicia 220) associated with the object 218 is positioned within the FOV of the glass windows 230 and/or 232. The indicia 220 may be a bar code (e.g., a quick response (QR) code, etc.), and/or any other product-identifying code.

Figure 4:
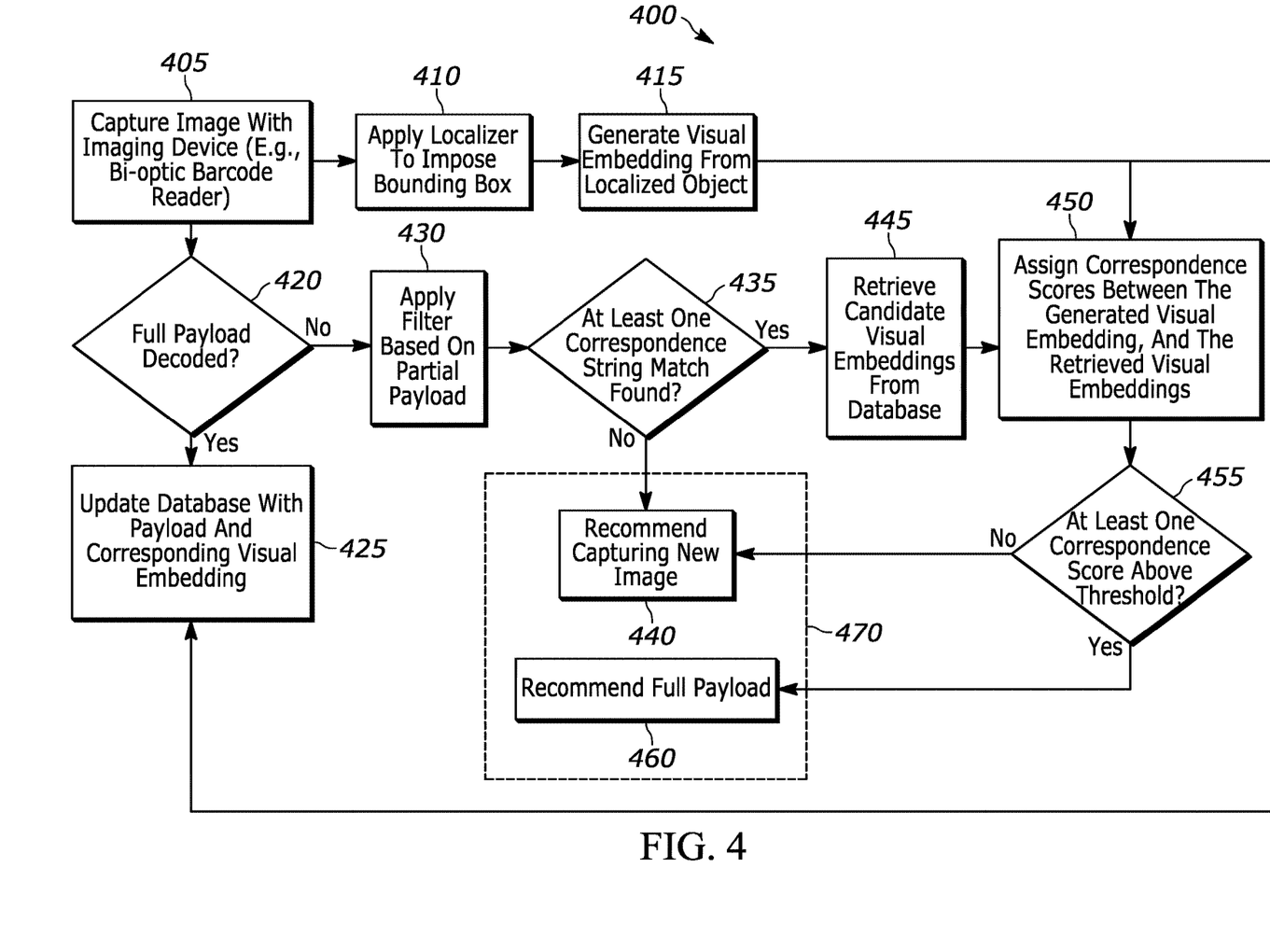
FIG. 4 is a flowchart representative of a method for enhancing decoding of indicia, in accordance with embodiments described herein.

FIG. 4 illustrates an example method 400 of enhancing decoding of indicia. The example method 400 begins, at block 405, by capturing an image with a imaging device 104 (e.g., a bi-optic barcode reader, a machine vision camera, etc.). The image data may include an indicia (or partial indicia) encoding a payload (or a partial payload). Further, the image may be received at an application (e.g., imaging application 116, indicia decoding enhancement application 128, etc.) executing on the user computing device 102) or the imaging device 104.

Figure 5:
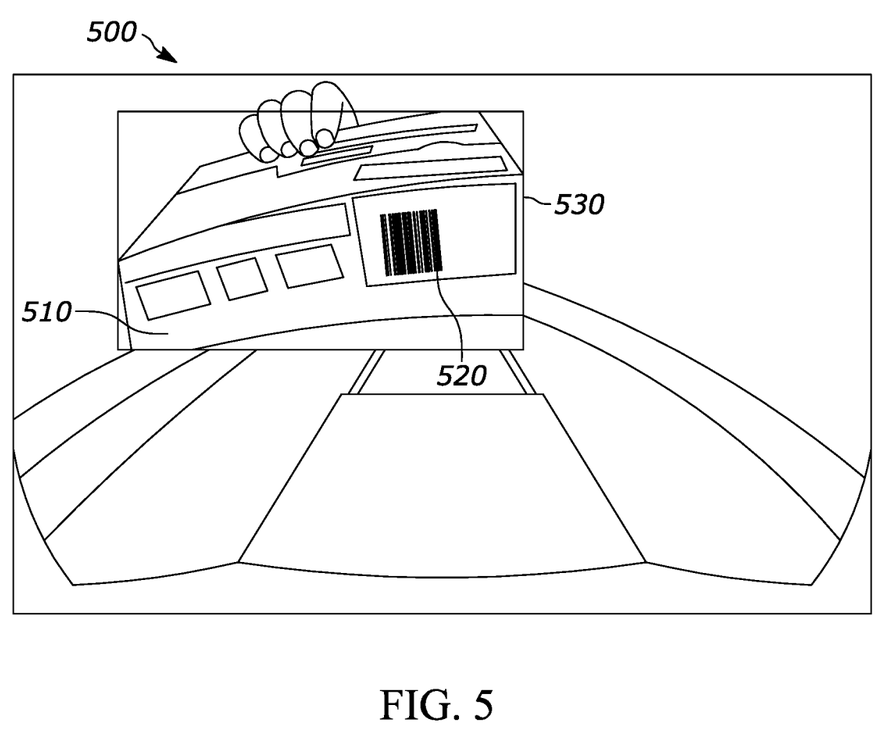
FIG. 5 shows an example image including an object with an indicia.

Once the image is received, the processors executing the application may apply (at block 410) a localizer to place a bounding box around an object in the image. Additionally or alternatively, the localizer may create a region of interest (ROI) to surround the object. The object in the image may be an object corresponding to the barcode. For instance, FIG. 5 shows an example image 500 including object 510, which, in the illustrated example, is a cereal box with indicia 520. In the illustrated example, the localizer has placed a bounding box 530 around the object 510. However, it may be noted that displaying an image, such as an image including a bounding box, is not necessary to perform the techniques described herein.

The localizer may be any suitable algorithm. For example, the localizer may be a neural network. Such a neural network may be trained by any suitable technique (e.g., a supervised learning process, an unsupervised learning process, a semi-supervised leaning process, etc.) to place bounding boxes (or create ROIs) around objects in images. Advantageously, using such a neural network improves the technical functioning of the system. More specifically, as will be seen, placing a bounding box (or creating an ROI) around the object improves the accuracy of the visual embeddings that will be generated for the image (e.g., because the visual embeddings may be generated for only the part of the image inside the bounding box or ROI). Furthermore, placing the bounding box or ROI improves algorithm run time because not the entire image needs to be analyzed to generate the visual embedding.

Returning now to FIG. 4, at block 415, a visual embedding is generated for the captured image (or the portion of the image within the bounding box ROI). The visual embedding may comprise an array of numbers, and may be generated by a machine learning algorithm such as a trained NN. To generate the visual embedding, the entire image may be analyzed, or only a portion of the image may be analyzed (e.g., the portion inside a bounding box or ROI placed at block 410).

In some embodiments, the NN is used to generate the visual embedding. In some embodiments, the NN is a convolutional neural network (CNN), e.g., a CNN having a ResNet architecture, such as ResNet-18, ResNet-34, ResNet-50, or a fully convolution neural network (FCN), etc. In this regard, a CNN is a specialized kind of NN for processing data in grid-like topology (e.g., a topology including layers). The CNN may use a mathematical operation of convolution to extract a set of features from the input image. The first layer of the CNN learns to recognize simple patterns, middle layers learn more complex patterns, while later layers locate and recognize major objects in the image.

Broadly speaking, a CNN's accuracy will increase as more layers are added. A residual neural network (ResNet) is a type of CNN that has been developed to address performance issues in which the CNNs performance was shown to worsen as layers were increased. In short, ResNets create alternate shortcut paths between layers of the CNN, ensuring that a higher layer will perform at least as well as a lower layer. Therefore, in some embodiments herein, the CNN used to generate the visual embeddings was implemented with a ResNet architecture. More generally, however, any suitable NN, in particularly a deep learning network, may be used to generate visual embeddings in accordance with the techniques herein.

The CNN (e.g., the residual NN) is trained to produce the visual embedding comprising an array of numbers. For example, to train the CNN, training images may be fed into the CNN. These training images may be of captured products (or objects more generally) that are to be processed by an imaging system. These training images may contain label data, automatically generated, manually generated, or some combination thereof. The training images may be fed to the CNN with an indication of whether the images are similar to other images or not, thus providing for supervised learning by the CNN. For instance, pairs of training images may be entered, and a user may enter input for each pair an indication if the two images in the pair are similar or dissimilar. For example, a user may mark two images as similar if both images contain the same type of object (e.g., a cereal box). In one variation, a user enters groups of three images at a time, with two of the images being similar, and one being dissimilar to the other two. Over time, this trains the CNN to generate similar visual embeddings for similar images. Of course, the CNN may be implemented having an un-supervised architecture, in other examples. In any event, as will be described further below (e.g., with respect to block 450), the more similar the visual embeddings are, the shorter the mathematical distance between them will be.

Moreover, the visual embedding may be generated regardless of whether the image is a color image (e.g., an RGB image), or a grayscale image. However, it should be appreciated that if the image is a grayscale image, the visual embedding is generated based upon less information than if the image was a color image (e.g., the visual embedding is not generated based upon color information).

In addition, following image capture at block 405, it may be determined if a full payload has been decoded from the indicia at block 420. For example, if the entire indicia is clear in the image, the full payload may be decoded. In addition, in some examples, the system may still be able to decode the full payload even if the entire indicia is not in the image (e.g., 95% of the indicia is in the image, but the system is still able to decode the full payload).

In some embodiments, blocks 420 and 410 are performed concurrently. If a full payload has been decoded, at block 425, a database 150 is updated to include the full payload and the corresponding visual embedding generated at block 415. Additionally or alternatively, either or both of the memory 110, 120 may be updated to include the full payload and corresponding visual embedding. In some embodiments, it is determined if the full payload already exists in the database 150 and/or memory 110, 120. If so, no updates to the database 150 and/or memory 110, 120 are made.

If a full payload was not decoded (in other words, only a partial payload was decoded), at block 430, the partial payload is used to filter through payloads (such as the payloads stored in the example table 700 of FIG. 7) in the database 150 (and/or either of the memories 110, 120). For example, if the partial payload comprises "038000" as in the example of FIG. 3B, the filter may yield all payloads including the character string "038000." Additionally or alternatively, in this example, the filter may be set to yield all payloads that begin or end with the character string "038000." It should be understood that the filter may be set to find full payloads on the basis of any partially decoded payload. For instance, the filter may still be set, even if the characters in the partial payload are not all consecutive (e.g., the partial payload comprises "123???456").

At block 435, the system determines if the filter has found at least one correspondence string. For instance, with the example partial indicia 350 of FIG. 3B, a determination may be made of if at least one match is found for "038000" (e.g., "038000168048," etc.). If not, at block 440, the system recommends that the imaging device 104 capture a new image.

If at least one string match is found, at block 445, candidate visual embeddings are retrieved for the matches found by the filter. The candidate visual embeddings may be retrieved from any of the database 150, the memory 110, and/or the memory 120.

For any string match, there may be one or more corresponding visual embeddings to retrieve as candidate visual embedding(s). In some embodiments where there is more than one visual embedding for a string match, the different visual embeddings are for different viewpoints of an object. For example, if the string match is for a UPC of a cereal box, there may be different visual embeddings for different views of the cereal box.

At block 450, correspondence score(s) are assigned. The correspondence scores may be scores indicating correspondence between the visual embedding generated at block 415, and the visual embeddings retrieved at block 445. In some embodiments, the correspondence scores may be based on a mathematical distance between the generated visual embedding and the retrieved visual embeddings. Examples of the mathematical distance include the Euclidian distance, and the cosine distance (e.g., the cosine similarity). In another example, the mathematical distance may be determined by a neural network trained to take two visual embeddings as inputs and output a "distance" between the two inputted visual embeddings (e.g., a "matcher" neural network). Such a neural network may be trained by any suitable technique (e.g., a supervised learning process, an unsupervised learning process, a semi-supervised leaning process, etc.) to determine mathematical distances between visual embeddings.

To illustrate the mathematical distance, consider the following two example visual embeddings. The first visual embedding is generated, for example, from the input image captured at block 405, where generated_visual_embedding= [0.70074661, 0.92530481, 0.70837988].

The second visual embedding is the retrieved visual embedding obtained at block 415, where retrieved_visual_embedding=[0.27283045, 0.44965911, 0.16657472].

The following calculation may then be performed to determine a distance between the two visual embeddings, that distance providing an indication of their similarity to one another: Euclidean_distance(generated_visual_embedding, retrieved_visual_embedding)=0.8384. Thus, in this example, if the correspondence score threshold (e.g., the threshold Euclidean distance) is 0.5, these two embeddings would not be a match.

Moreover, it should be noted that because similar images generate similar visual embeddings, the more similar images are, the shorter the mathematical distance between their visual embeddings will be. For example, if the only difference between objects in an image is the color of the object, there will be a shorter mathematical distance than if both the color and size of the objects are different.

At block 455, it is determined if at least one correspondence score is above a correspondence score threshold. A purpose of this is to determine that there is a sufficient match between the generated visual embedding and the retrieved visual embeddings. If not, the system may recommend capturing a new image at block 440 (e.g., there is not a sufficient match between the visual embeddings, so the system recommends capturing a new image with a better view of the indicia).

If there is at least one correspondence score above the threshold, at block 460, the system may recommended determining the full payload to be the payload corresponding to the retrieved visual embedding with the highest correspondence score. It should thus be understood either of blocks 440 or 460 form the recommendation 470.

It should be understood that the example method 400 may be performed in whole or in part by any suitable component(s) illustrated in FIG. 1. For instance, the example method 400 may be performed by one or both of the imaging application(s) 116 and/or indicia decoding enhancement application 128.

Additionally, it is to be understood that each of the actions described in the example method 400 may be performed in any order, number of times, or any other suitable combination(s). For example, some or all of the blocks of the example method 400 may be fully performed once or multiple times. In some example implementations, some of the blocks may not be performed while still effecting operations herein.

ADDITIONAL CONSIDERATIONS

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for enhancing decoding of indicia, the method comprising:
capturing image data with an imaging device, the image data including a partial indicia encoding at least a partial payload;
generating a visual embedding from the image data;
identifying, in the image data, the partial indicia and decoding the partial indicia to determine the at least partial payload;
responsive to the at least partial payload not being a full payload, determining one or more candidate visual embeddings corresponding to the at least partial payload;
comparing the one or more candidate visual embeddings to the visual embedding generated from the image data and assigning a correspondence score for each of the one or more candidate visual embeddings based on the comparing of the one or more candidate visual embeddings to the visual embedding generated from the image data; and
determining a recommendation based on the correspondence score for each of the one or more candidate visual embeddings.

2. The method of claim 1, wherein the recommendation is to determine the full payload according to a highest score of the correspondence scores assigned for each of the one or more candidate visual embeddings.

3. The method of claim 1, wherein the recommendation is to determine the full payload to be a character string corresponding to a highest score of the correspondence scores assigned for each of the one or more candidate visual embeddings.

4. The method of claim 1, wherein:
responsive to a highest correspondence score of the correspondence scores assigned for each of the one or more candidate visual embeddings being below a correspondence score threshold, determining the recommendation to be capturing additional image data at the imaging device; and
the method further comprises:
in response to determining the recommendation to be capturing the additional image data, capturing the additional image data with the imaging device, the additional image data including an indicia; and
attempting to decode the indicia of the additional image data.

5. The method of claim 1, wherein:
each of the determined one or more candidate visual embeddings comprise a different array of numbers;
the generated visual embedding comprises an array of numbers; and
the comparing of the one or more candidate visual embeddings to the visual embedding generated from the image data comprises comparing each of the array of numbers of the candidate visual embeddings to the array of numbers of the generated visual embedding.

6. The method of claim 1, wherein the comparing the one or more candidate visual embeddings to the visual embedding generated from the image data comprises determining mathematical distances between the one or more candidate visual embeddings and the visual embedding generated from the image data.

7. The method of claim 1, wherein the generating the visual embedding comprises: (i) applying a localizer comprising a neural network to impose a bounding box surrounding an object in an image corresponding to the image data, and (ii) analyzing a portion of the image data that is inside the bounding box to generate the visual embedding.

8. The method of claim 1, wherein:
the one or more candidate visual embeddings comprise a first candidate visual embedding, and a second candidate visual embedding; and
the first candidate visual embedding corresponds to a different viewpoint of an object than the second candidate visual embedding.

9. The method of claim 1, wherein the generating the visual embedding comprises using a visual embedding generator comprising a neural network.

10. The method of claim 9, wherein the neural network comprises a residual neural network.

11. The method of claim 1, wherein the determining the one or more candidate visual embeddings comprises filtering, based on the determined at least partial payload, visual embeddings stored in a database to determine the one or more candidate visual embeddings.

12. An imaging system for enhancing decoding of indicia, the imaging system comprising:
an imaging device configured to capture image data including a partial indicia encoding at least a partial payload;
a memory storing computer-readable instructions; and
a processor configured to execute the computer-readable instructions stored on the memory to:
receive the image data captured by the imaging device;
generate a visual embedding from the image data;
identify, in the image data, the partial indicia and decode the partial indicia to determine the at least partial payload;
responsive to the at least partial payload not being a full payload, determine one or more candidate visual embeddings corresponding to the at least partial payload;
compare the one or more candidate visual embeddings to the visual embedding generated from the image data and assign a correspondence score for each of the one or more candidate visual embeddings based on the compare of the one or more candidate visual embeddings to the visual embedding generated from the image data; and
determine a recommendation based on the correspondence score for each of the one or more candidate visual embeddings.

13. The system of claim 12, wherein the wherein the processor is further configured to execute the computer-readable instructions stored on the memory to:
responsive to the at least partial payload being a full payload, update a database by adding: (i) the full payload; (ii) the visual embedding generated from the image data; (iii) an indication that the full payload corresponds to the visual embedding generated from the image data.

14. The system of claim 12, wherein the recommendation is to determine the full payload according to a highest score of the correspondence scores assigned for each of the one or more candidate visual embeddings.

15. The system of claim 12, wherein the recommendation is to determine the full payload to be a character string corresponding to a highest score of the correspondence scores assigned for each of the one or more candidate visual embeddings.

16. The system of claim 12, wherein the processor is further configured to execute the computer-readable instructions stored on the memory to:
   responsive to a highest correspondence score of the correspondence scores assigned for each of the one or more candidate visual embeddings being below a correspondence score threshold, determine the recommendation to be capturing additional image data at the imaging device;
   in response to determining the recommendation to be capturing the additional image data, receive, the additional image data captured by the imaging device, the additional image data including an indicia; and
   attempt to decode the indicia of the additional image data.

17. The system of claim 12, wherein:
   each of the determined one or more candidate visual embeddings comprise a different array of numbers;
   the generated visual embedding comprises an array of numbers; and
   the compare of the one or more candidate visual embeddings to the visual embedding generated from the image data comprises comparing each of the array of numbers of the candidate visual embeddings to the array of numbers of the generated visual embedding.

18. The system of claim 12, wherein the compare of the one or more candidate visual embeddings to the visual embedding generated from the image data comprises determining mathematical distances between the one or more candidate visual embeddings and the visual embedding generated from the image data.

19. The system of claim 12, wherein the generate of the visual embedding comprises: (i) applying a localizer comprising a neural network to impose a bounding box surrounding an object in an image corresponding to the image data, and (ii) analyzing a portion of the image data corresponds to an inside of the bounding box to generate the visual embedding.

20. The system of claim 12, wherein:
   the one or more candidate visual embeddings comprise a first candidate visual embedding, and a second candidate visual embedding; and
   the first candidate visual embedding corresponds to a different viewpoint of an object than the second candidate visual embedding.

* * * * *